US009478993B2

(12) United States Patent
Kim et al.

(10) Patent No.: US 9,478,993 B2
(45) Date of Patent: Oct. 25, 2016

(54) CATHODE COMPOSITE MATERIAL SYNTHESIS HAVING HIGH ENERGY DENSITY FOR LITHIUM SECONDARY BATTERY FOR ELECTRIC VEHICLE AND ELECTRODE MANUFACTURING TECHNOLOGY THEREOF

(71) Applicant: Korea Institute of Industrial Technology, Cheonan-si, Chungcheongnam-do (KR)

(72) Inventors: Ho Sung Kim, Suwon-si (KR); Ju Hee Kang, Gwangju-si (KR); Ik Hyun Oh, Gwangju-si (KR); Seong Jae Boo, Yongin-si (KR); Duck Rye Chang, Anyang-si (KR); Tae Won Kim, Gwangju-si (KR); Sung Hee Park, Gwangju-si (KR); Kyeong Wan Kim, Gwangju-si (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 277 days.

(21) Appl. No.: 14/353,279

(22) PCT Filed: Oct. 19, 2012

(86) PCT No.: PCT/KR2012/008613
§ 371 (c)(1),
(2) Date: Apr. 21, 2014

(87) PCT Pub. No.: WO2013/058604
PCT Pub. Date: Apr. 25, 2013

(65) Prior Publication Data
US 2014/0306664 A1 Oct. 16, 2014

(30) Foreign Application Priority Data

Oct. 21, 2011 (KR) ........................ 10-2011-0108159
Feb. 27, 2012 (KR) ........................ 10-2012-0019666

(51) Int. Cl.
*H02J 7/00* (2006.01)
*H01M 4/505* (2010.01)
(Continued)

(52) U.S. Cl.
CPC ................ *H02J 7/00* (2013.01); *C01D 15/02* (2013.01); *H01M 4/0402* (2013.01);
(Continued)

(58) Field of Classification Search
CPC ...... H02J 7/00; H01M 4/0402; H01M 4/525; H01M 4/505; H01M 10/052; C01D 15/02; Y02P 70/54; Y02T 10/7011; Y02E 60/122
See application file for complete search history.

(56) References Cited

U.S. PATENT DOCUMENTS 6,316,145 B1 11/2001 Kida et al.
7,238,453 B2 * 7/2007 Xu ........................ H01M 4/131
429/217

(Continued)

FOREIGN PATENT DOCUMENTS

JP 2001023617 A 1/2001
JP 2006036620 A 2/2006
(Continued)

OTHER PUBLICATIONS

ISA Korean Patent Office, International Search Report of PCT/KR2012/008613, WIPO, May 31, 2013, 7 pages.
(Continued)

*Primary Examiner* — Naum B Levin
(74) *Attorney, Agent, or Firm* — Alleman Hall McCoy Russell & Tuttle LLP

(57) ABSTRACT

The present invention relates to the manufacture of a high capacity electrode by synthesizing an excellent $Li_2MnO_3$-based composite material $Li(Li_xNi_yCo_zMn_wO_2)$ to improve the characteristics of an inactive $Li_2MnO_3$ material with a specific capacity of about 460 mAh/g. Here, a manufacturing method of a cathode material for a lithium secondary battery uses a $Li_2MnO_3$-based composite material $Li(Li_xNi_yCo_zMn_wO_2)$ by reacting a starting material wherein a nickel nitrate solution, a manganese nitrate solution and a cobalt nitrate solution are mixed, with a complex agent by co-precipitation.

19 Claims, 9 Drawing Sheets

(51) Int. Cl.
  *H01M 4/525* (2010.01)
  *C01D 15/02* (2006.01)
  *H01M 4/04* (2006.01)
  *H01M 10/052* (2010.01)

(52) U.S. Cl.
  CPC ........... *H01M 4/505* (2013.01); *H01M 4/525* (2013.01); *H01M 10/052* (2013.01); *Y02E 60/122* (2013.01); *Y02P 70/54* (2015.11); *Y02T 10/7011* (2013.01)

(56) References Cited

U.S. PATENT DOCUMENTS

| | | | |
|---|---|---|---|
| 7,829,045 B2* | 11/2010 | Sun | C01G 53/006 423/179.5 |
| 7,998,608 B2* | 8/2011 | Mori | H01M 2/1252 429/53 |
| 8,394,534 B2* | 3/2013 | Lopez | C01G 45/1257 429/223 |
| 2003/0124423 A1 | 7/2003 | Sasaki et al. | |
| 2004/0228791 A1* | 11/2004 | Park | C01G 45/1228 423/594.6 |
| 2005/0026040 A1 | 2/2005 | Thackeray et al. | |
| 2007/0281212 A1 | 12/2007 | Thackeray et al. | |
| 2010/0323244 A1* | 12/2010 | Chiang | H01B 1/122 429/220 |
| 2011/0052981 A1* | 3/2011 | Lopez | C01G 45/1257 429/206 |
| 2011/0168550 A1 | 7/2011 | Wang et al. | |
| 2012/0040247 A1 | 2/2012 | Manivannan et al. | |
| 2015/0380720 A1* | 12/2015 | Kim | H01M 4/1391 320/130 |

FOREIGN PATENT DOCUMENTS

| | | |
|---|---|---|
| JP | 2006107818 A | 4/2006 |
| JP | 2007145695 A | 6/2007 |
| JP | 2008251526 A | 10/2008 |
| JP | 2009009753 A | 1/2009 |
| JP | 2009259505 A | 11/2009 |
| JP | 2010108873 A | 5/2010 |
| JP | 2010146900 A | 7/2010 |
| JP | 2011034943 A | 2/2011 |
| JP | 2011082150 A | 4/2011 |
| JP | 2011134670 A | 7/2011 |
| KR | 1020100068459 A | 6/2010 |
| WO | 2011040383 A1 | 4/2001 |
| WO | 03044881 A1 | 5/2003 |
| WO | 2008155989 A1 | 12/2008 |
| WO | 2009060603 A1 | 5/2009 |
| WO | 2012030639 A2 | 3/2012 |

OTHER PUBLICATIONS

Korean Patent Office, Office Action of Korean Patent Application No. 10-2011-0108159, May 29, 2013, 3 pages.

* cited by examiner

US 9,478,993 B2

CATHODE COMPOSITE MATERIAL SYNTHESIS HAVING HIGH ENERGY DENSITY FOR LITHIUM SECONDARY BATTERY FOR ELECTRIC VEHICLE AND ELECTRODE MANUFACTURING TECHNOLOGY THEREOF

CROSS-REFERENCE TO RELATED APPLICATIONS

The present application is the U.S. National Phase of International PCT Application Serial No. PCT/KR2012/008613 filed on Oct. 19, 2012, which claims priority to Korean Patent Application No. 10-2011-0108159, filed on Oct. 21, 2011 and Korean Patent Application No. 10-2012-0019666, filed on Feb. 27, 2012, the entire disclosures of each of which are hereby incorporated by reference in their entirety for all purposes.

TECHNICAL FIELD

The present invention relates to a method of synthesizing a $Li_2MnO_3$-based composite material enabling high-energy density by realizing high capacity by synthesis of a high-capacity/high-voltage cathode material and a solid solution material, and a method of manufacturing an electrode using the same.

BACKGROUND ART

A lithium secondary battery with a high energy density is expected to be used in various applications, not only for small IT equipment such as mobile phones and notebook PCs, but also as a medium and large-size battery for electric cars and power storage. In particular, there is a demand for development of a cathode material with a high degree of safety and a high energy density required for medium and large-sized lithium secondary batteries for electric vehicles and power storage. Generally, safe electrode materials with an excellent capacity based on a $LiCoO_2$-based material, for example, $LiMn_2O_4$ (LMO) and a high-capacity $LiMn_{1/3}Co_{1/3}Ni_{1/3}O_2$ (NMC), have been studied for a lithium secondary battery. However, such materials basically have a low capacity limited a sufficient level of safety, and thus safe, excellent, and high-energy density materials need to be developed for common use of medium and large-sized batteries.

For electric cars, a distance over which a vehicle may travel on a single charge is crucial, which is related to an energy density of secondary battery cathode materials and thus, research and development on high-performance cathode materials is essential. Existing LMO or NMC and olivine cathode materials have an energy density of about 120 to 150 milliampere hours/gram (mAh/g), which is insufficient for a remarkable improvement in a driving distance of electric cars.

A $Li_2MnO_3$-based composite material basically has a specific high capacity of about 460 mAh/g and provides a high initial capacity of about 200 to 250 mAh/g in practice, with a relatively high average discharging voltage of about 3.5 volts (V). Thus, the $Li_2MnO_3$-based composite material is known as a next-generation cathode material candidate to realize a high capacity and a high energy density, and accordingly studies are being conducted on a high-efficiency method of synthesizing cathode materials with great potential for high performance.

Primary requirements for medium and large-sized lithium secondary batteries for electric cars and power storage are safety and a high energy density. Accordingly, research and development is conducted to secure safety for medium and large-sized lithium secondary batteries using conventional methods, such as a process of mixing a spinel-manganese LMO material with a comparatively high-capacity NMC material in a proper composition or a process of manufacturing an olivine-based $LiFePO_4$ material which has a relatively low discharging voltage of about 3.0 V but provides a high degree of safety and a high capacity.

However, these conventional LMO, NMC, and olivine-based $LiFePO_4$ materials provide low-capacity batteries and thus, have limitations in terms of improving a distance over which a vehicle may travel on a single charge.

Conventional cathode materials have a basic energy density of about 120 to 140 mAh/g, which is insufficient and thus, have limitations in realizing common use of applications needing high energy density, such as electric cars. Particularly, since iron phosphate materials receiving attention in recent years have a low voltage and definite limitations in capacity increase (4V, 150 mAh/g), developing cathode materials with an excellent energy density is a pressing concern. Batteries of conventional electrode materials mostly operate in a charging voltage range of 2.0 to 4.2 V.

Conventional cathode materials have issues in view of safety, cost, and energy density. A nickel-based $LiNiO_2$ (LNO) material with excellent capacity does not provide a sufficient level of safety, a manganese-based LMO is insufficient in terms of capacity and durability, an NMC exhibits insufficient performance in terms of safety and cost, and iron phosphate materials are inadequate in terms of energy density and cost.

The conventional manganese-based materials with excellent safety have a low capacity and are not given significant consideration in terms of durability, and thus active research and development is not being conducted on these materials. Iron phosphate materials are also involved in studies on nanotechnology to obtain high-capacity electrode performance, resulting in an increased cost for nanoscale materials. Thus, since charging and discharging are performed in a range of about 2.0 to 4.2 V to secure safety of the convention materials, these materials basically have a limited discharging capacity.

DISCLOSURE OF INVENTION

Technical Goals

An aspect of the present invention is developing a next-generation cathode composite material with a high capacity, a high energy density, and high level of safety.

Technical Solutions

According to an aspect of the present invention, there is provided a method of preparing a cathode material for a high-capacity lithium secondary battery, in which a $Li_2MnO_3$-based composite material $Li(Li_xNi_yCo_zMn_w O_2)$ is synthesized by reacting a starting material mixture of a nickel nitrate solution, a manganese nitrate solution, and a cobalt nitrate solution with a complex agent by co-precipitation.

The starting material mixture is obtained by mixing $Ni(NO_3)_2 \cdot 6H_2O$, $Mn(NO_3)_2 \cdot 6H_2O$ and $Co(NO_3)_2 \cdot 6H_2O$ at a mole ratio of 1:4:1. The complex agent is an ammonia solution, and the starting material mixture is reacted with 0.8 moles (M) of the complex agent in the reactor. Further, a NaOH solution is added to a mixed solution of the starting material mixture and the complex agent to adjust a pH.

Lithium(x) is of 0.02 to 0.60 in the composite material Li(Li$_x$Ni$_y$Co$_z$Mn$_w$O$_2$). Specifically, x is 0.05, y is 0.16, z is 0.18 and w is 0.66 in the composite material Li(Li$_x$Ni$_y$Co$_z$Mn$_w$O$_2$).

LiMn$_{1/3}$Co$_{1/3}$Ni$_{1/3}$O$_2$ (NMC) may be mixed with Li$_2$MnO$_3$. Here, Li$_2$MnO$_3$ may be prepared by precipitating a Li$_2$MnO$_3$ precursor by mixing and titrating a lithium hydroxide solution with a manganese solution, drying the Li$_2$MnO$_3$ precursor, conducting first-sintering on dried Li$_2$MnO$_3$ precursor at 650° C. for 12 hours, and conducting second-sintering at 850° C. for 24 hours after the first-sintering is completed to produce a final Li$_2$MnO$_3$ powder. 30% of the NMC may be added to Li$_2$MnO$_3$.

According to another aspect of the present invention, there is provided a method of manufacturing an electrode of a lithium secondary battery, the method including synthesizing a Li$_2$MnO$_3$-based composite material Li(Li$_x$Ni$_y$Co$_z$Mn$_w$O$_2$) by reacting a starting material mixture of a nickel nitrate solution, a manganese nitrate solution and a cobalt nitrate solution with a complex agent by co-precipitation, preparing a slurry by mixing the composite material Li(Li$_x$Ni$_y$Co$_z$Mn$_w$O$_2$) with a conductive agent and a binder, applying the slurry, drying the applied slurry, pressing the dried slurry, and punching the slurry in an electrode cell form.

The slurry is prepared by mixing the composite material Li(Li$_x$Ni$_y$Co$_z$Mn$_w$O$_2$), the conductive agent and the binder at a weight ratio (wt %) of 80:10:10. The slurry may be prepared by adding 30% of NMC to Li$_2$MnO$_3$.

The pressing is performed such that a thickness of the slurry is reduced by 20% from that in the applying of the slurry. The applying of the slurry applies the slurry to an aluminum foil to have a thickness of 100 to 110 micrometers (μm), and the slurry has a thickness of 80 to 90 μm after pressing for thickness adjustment.

According to still another aspect of the present invention, there is provided a method of charging and discharging a lithium secondary battery, the method including repeatedly charging and discharging an electrode cell at a constant electric current density of 0.1 C within a range of 2.0 to 4.9 volts (V), the electrode cell being manufactured by using a Li$_2$MnO$_3$-based composite material Li(Li$_x$Ni$_y$Co$_z$Mn$_w$O$_2$) synthesized by reacting a starting material mixture of a nickel nitrate solution, a manganese nitrate solution, and a cobalt nitrate solution with a complex agent by co-precipitation.

As described above, according to exemplary embodiments of the present invention, the capacity of electrode cell reversibly increases in the range of 2.0 to 4.5 volts (V) and maintains a high capacity of 175 milliampere hours/gram (mAh/g) at a 15 cycle in charging and discharging.

Furthermore, the Li$_2$MnO$_3$-based composite material having a high capacity of about 200 to 240 mAh/g in a range of 2.0 to 4.9 V may be prepared.

Further, an electrode manufactured according to the present invention is expected to control a defective rate due to an ease of an electrode manufacturing process, to achieve a high output due to improvements in utilization of an active material, and to enhance durability due to improvements in charging efficiency. As a result, when the Li$_2$MnO$_3$-based composite material is applied to medium and large-sized lithium secondary batteries, cost reduction and quality enhancement due to an improved electrode manufacturing process and charging efficiency, and enhanced reliability due to a long lifetime may be realized.

BEST MODE FOR CARRYING OUT THE INVENTION

Hereinafter, exemplary embodiments of the present invention will be described in detail with reference to the accompanying drawings, while the present invention is not limited to the exemplary embodiments. Detailed descriptions of known functions and configurations may be omitted herein so as to clarify the substance of the present invention.

Below, processes of manufacturing electrodes using Li$_2$MnO$_3$-based composite materials for lithium secondary batteries according to exemplary embodiments of the present invention will be described in detail with reference to FIGS. 1 to 9.

Figure 1:
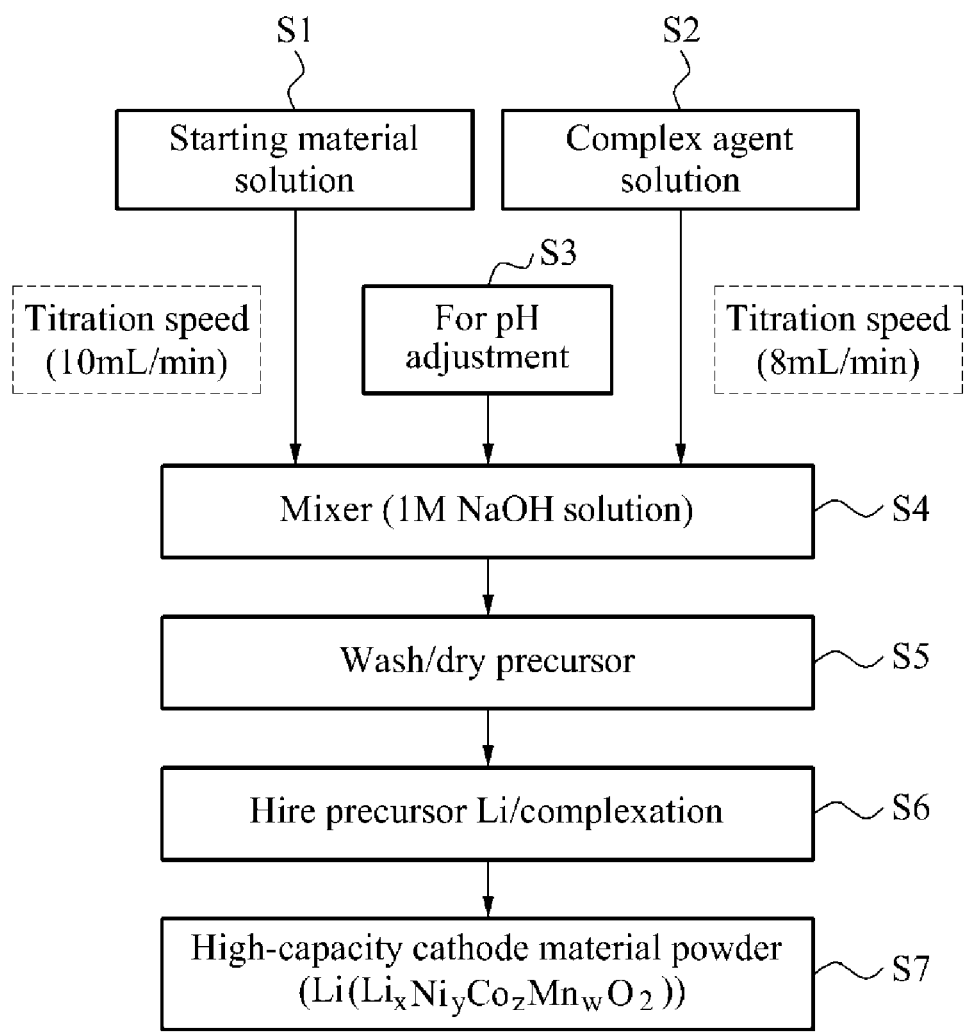
FIG. 1 is a flowchart illustrating a method of synthesizing a Li$_2$MnO$_3$-based composite material Li(Li$_x$Ni$_y$Co$_z$Mn$_w$O$_2$).

Referring to FIG. 1, a process of synthesizing a Li$_2$MnO$_3$-based composite material Li(Li$_x$Ni$_y$Co$_z$Mn$_w$O$_2$) uses co-precipitation.

Ni(NO$_3$)$_2$.6H$_2$O, Mn(NO$_3$)$_2$.6H$_2$O and Co(NO$_3$)$_2$.6H$_2$O as starting materials are prepared at a mole ratio of 1:4:1 and dissolved in 500 milliliters (ml) of distilled water (S1), a 5 N ammonia solution as a complex agent is dissolved in 500 ml of distilled water to prepare a 0.8 molar (M) aqueous solution (S2), and 500 ml of a 1 M NaOH solution for a pH adjustment is prepared (S3).

Next, 500 ml of a NaOH solution prepared in a beaker is transferred to a co-precipitation reactor, adjusting temperature of the reactor to 55° C. and speed of an impeller of the reactor to about 1,000 revolutions per minute (rpm) at a pH of about 11. To start co-precipitation, the NaOH solution is titrated with the starting material solution at about 10 ml/min, simultaneously with the ammonia solution as the complex agent at 8 ml/min. Also, titration with the 1 M NaOH solution for pH adjustment in co-precipitation is set to be automatically carried out based on a pH change of the reactor.

Once completed, a product resulting from the co-precipitation is aged for 24 hours at the same impeller stirring speed and the same temperature (S4).

Subsequently, the product is washed to a pH of about 7 to 8, and the washed precipitate is dried overnight in an ordinary drier at about 110° C. (S5), thereby preparing first precursor powder (S6).

The prepared precursor powder, $(Ni_aCo_bMn_c)OH_2$, is uniformly mixed with a $LiOH.H_2O$ to hire lithium in a mortar, followed by heat treatment at 500° C. for 10 hours while elevating temperature at 5° C./min, and additional firing at 1,000° C. for 20 hours, thereby producing final high-capacity cathode composite material $Li(Li_xNi_yCo_zMn_wO_2)$ which is black powder (S7).

Here, in the high-capacity cathode composite material $Li(Li_xNi_yCo_zMn_wO_2)$, lithium(x) is 0.02 to 0.60. Specifically, in the composite material $Li(Li_xNi_yCo_zMn_wO_2)$, x=0.05, y=0.16, z=0.18, and w=0.66.

Figure 4:
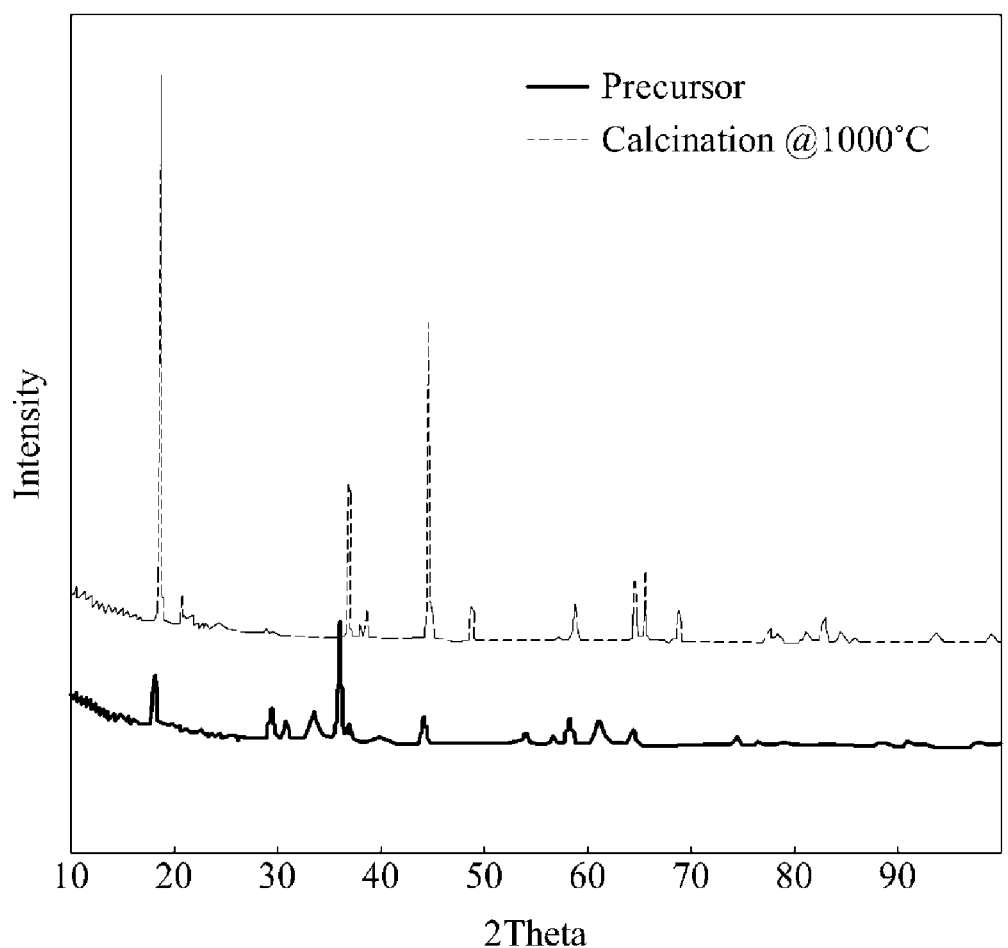
FIG. 4 is an X-ray diffraction (XRD) graph analyzing a structure of the Li$_2$MnO$_3$-based composite material Li(Li$_x$Ni$_y$Co$_z$Mn$_w$O$_2$).

A composition of the $Li_2MnO_3$ composite cathode material synthesized in the foregoing conditions is identified through inductively coupled plasma (ICY) analysis, and a structure and shape thereof through x-ray diffraction (XRD), and analysis results are illustrated in FIG. 4.

Referring to FIG. 4, a super lattice peak of a monoclinic structure of $Li_2MnO_3$ is observed around 22° of 2Theta.

Below, a process of synthesizing a $Li_2MnO_3$ material according to another exemplary embodiment of the present invention will be described in detail. Here, the $Li_2MnO_3$ material is synthesized using co-precipitation.

Figure 2:
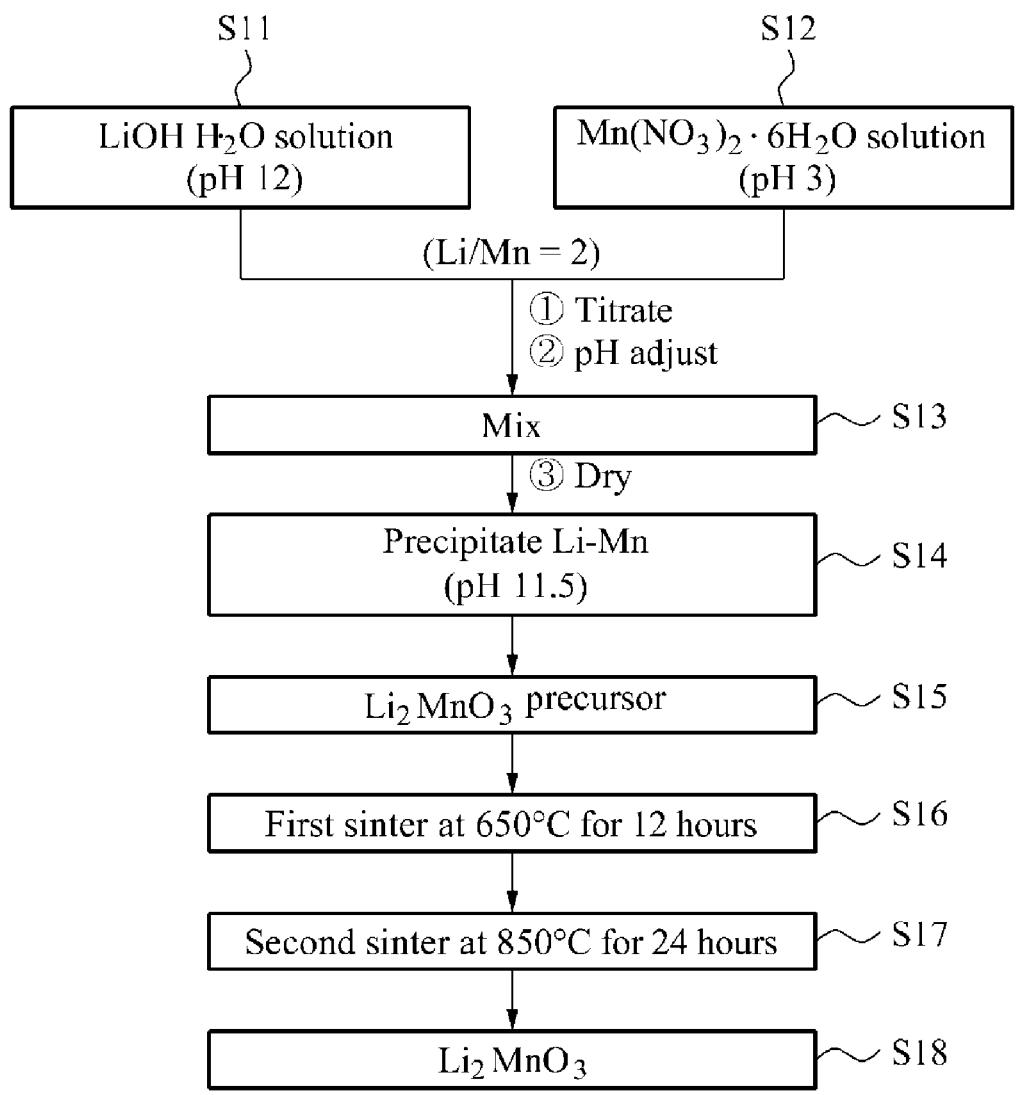
FIG. 2 is a flowchart illustrating a process of synthesizing a Li$_2$MnO$_3$ material according to an exemplary embodiment of the present invention.

Referring to FIG. 2, 100 ml of distilled water and 2.93 grams (g) of $LiOH.H_2O$ (98% lithium hydroxide monohydrate, Samchun Pure Chemical Co., Ltd., Korea) are stirred in a 1 liter (L) round glass flask at room temperature to prepare a 0.1 M lithium hydroxide solution (S11).

Next, 100 ml of distilled water and 2.93 g of $Mn(NO_3)_2.6H_2O$ (97% manganese(II) nitrate hexahydrate, Alfa aser, Japan) are stirred to prepare a manganese solution, after which the lithium hydroxide solution is successively titrated with the manganese solution at room temperature and 1.5 ml/min (S12).

Here, stirring speed is adjusted to 1,000 revolutions per minute (rpm) or higher so that a precipitate is thoroughly stirred (S13). As the lithium hydroxide solution, which is initially colorless with a pH of 12.24, is titrated with the manganese solution with a pH of 3.51, the colorless precipitate gradually turns light brown to dark brown, from yellow. When titration is finished, the precipitate exhibits a pH of 11.5 (S14).

The synthesized lithium-manganese hydroxide is stirred in thermostat container of 80° C. without washing, after which the solvent is removed using a rotavapor system, thereby obtaining a microscale $Li_2MnO_3$ precursor (S15). The obtained precursor powder is dried for 24 hours in an ordinary drier at 80° C., the same temperature of the thermostat, and is subjected to first sintering of heating while elevating temperature at 5° C./min and maintained at 650° C. for 12 hours in which a nitrate is decomposed and a lithiated layer oxide is formed (S16). After the first sintering, the powder is subjected to a second sintering maintained at 850° C. for 24 hours in which the first powder is annealed (S17), thereby obtaining final dark red powder (S18).

Figure 3:
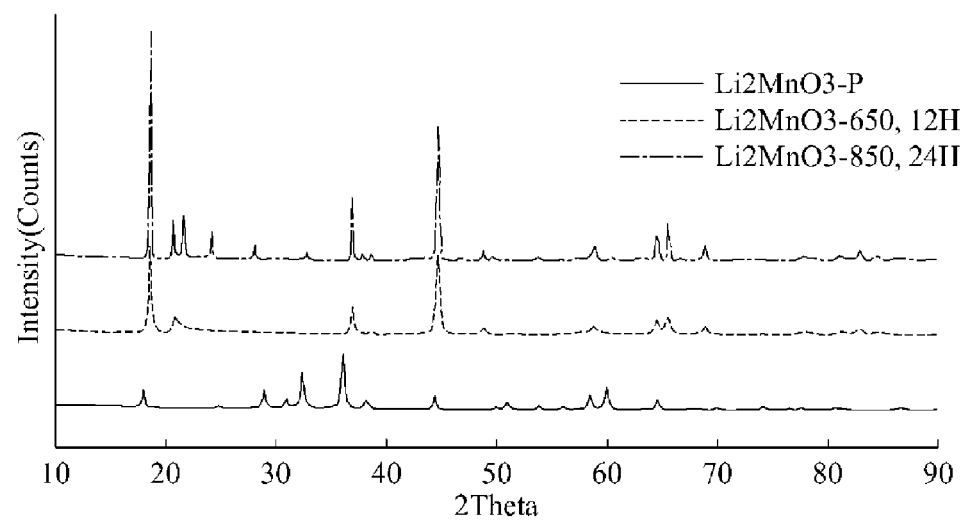
FIG. 3 is a graph illustrating a crystalline structure of the Li$_2$MnO$_3$ material according to the exemplary embodiment of the present invention.

Referring to FIG. 3, observing peaks of Li/Mn orderings of the synthesized $Li_2MnO_3$ precursors according to the present embodiment, all precursors exhibit peaks substantially relying on the sintering temperatures, wherein the precursor obtained via sintering at about 650° C. has a structure with broadly appearing peaks and the precursor obtained via sintering at 850° C. has a structure with a very ideal Li/Mn ordering.

Referring to FIG. 4, in the XRD structure, from that the supper lattice peak indicating the monoclinic structure is observed in a 20 to 30 theta range, it may be understood that the prepared $Li_2MnO_3$ composite cathode material is provided in a form of combination of the monoclinic structure and a hexagonal structure.

Figure 5:
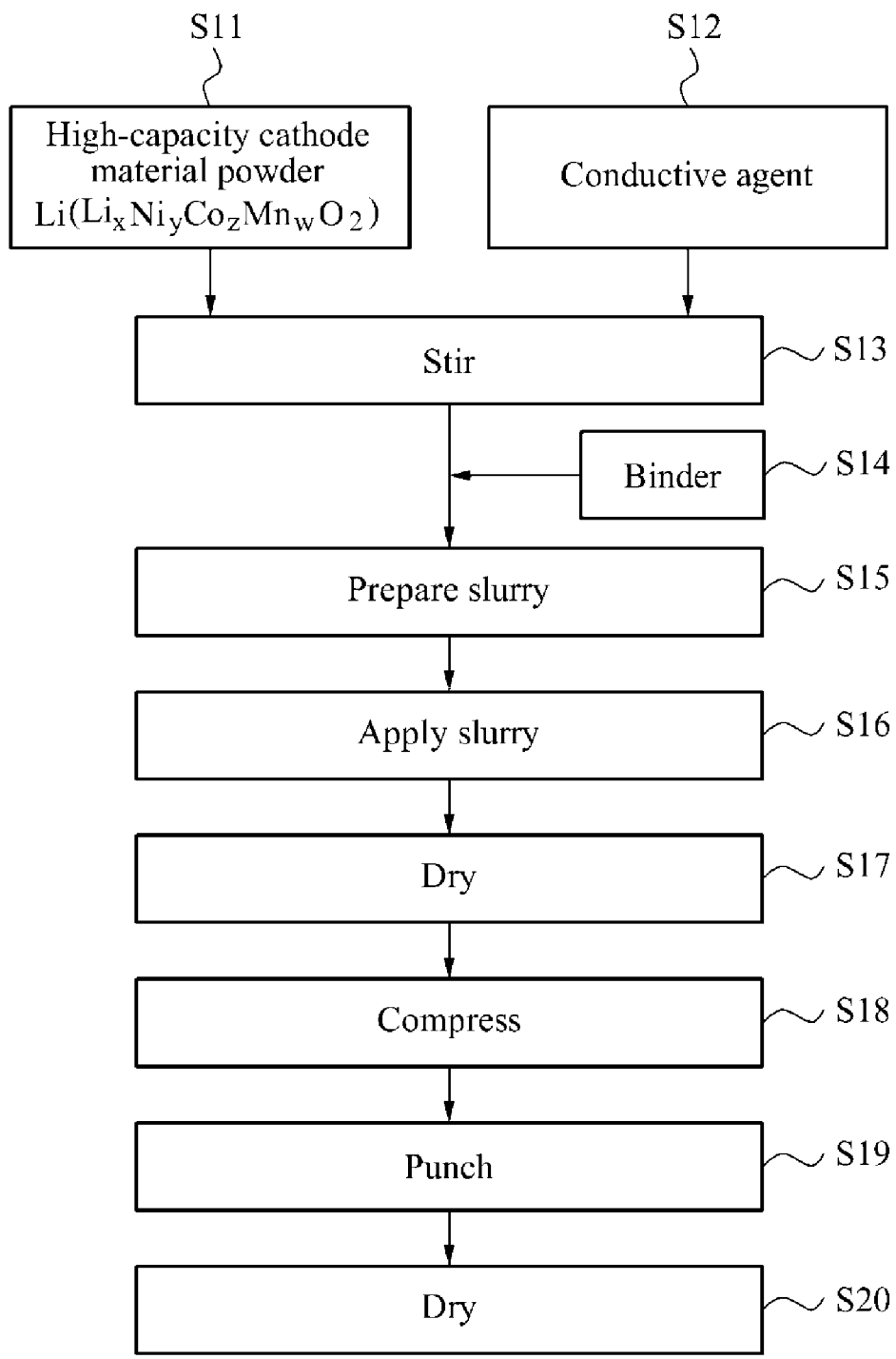
FIG. 5 is a flowchart illustrating a method of manufacturing an electrode of a lithium secondary battery using the Li$_2$MnO$_3$-based composite material Li(Li$_x$Ni$_y$Co$_z$Mn$_w$O$_2$) synthesized by the method of FIG. 1.

Hereinafter, a method of manufacturing an electrode using the prepared $Li_2MnO_3$ composite cathode material will be described with reference to FIG. 5.

The $Li_2MnO_3$-based composite material $Li(Li_xNi_yCo_zMn_wO_2)$ powder (S11) prepared according to the method of FIG. 1 and a conductive agent (Super P, S12) are prepared at a weight ratio, manually and thoroughly stirred in a mortar (S13) and transferred to a mixer (THINKY, JAPAN), after which the mixture in the mixer is titrated with polyvinylidene fluoride (PVDF, 8 wt %) as a binder (S14) at a proper ratio. That is, the $Li_2MnO_3$ composite material as a cathode active material, the conductive agent and the binder are prepared at a weight ratio of 80:10:10 wt % and subjected to the mixer at 2,000 rpm for 30 minutes, thereby preparing a slurry.

Here, stirring by the mixer is carried out for about 30 minutes in total by repeating a process of 5-minute stirring and viscosity checking about five or six times, wherein viscosity of the mixture is adjusted by N-Methylpyrrolidone (NMP) titration.

Here, optimal conditions may need to be maintained during stirring to prevent changes to viscosity or physical properties of the mixture in the mixer due to heat generation by the operating mixer. To this end, a stirring time of the slurry mixture and kind and size of a ball in the mixer are optimally adjusted. Specifically, a zirconia ball may be used with a properly adjusted size. Further, the zirconia ball is applied for a limited time of at least 5 minutes to prevent change of physical property (viscosity) of the slurry mixture in the mixer.

The prepared slurry is formed into a film on aluminum foil with a thickness of 20 micrometers (μm) by casting, in which the slurry is applied uniformly in one direction with constant force (S16).

The electrode coated with the slurry is thoroughly dried overnight in an ordinary drier at 110° C. (S17). Here, the slurry is applied such that the thoroughly dried electrode has a thickness of about 100 to 110 μm, and the electrode is subjected to pressing using a roll press so that the thickness is finally reduced by about 20% to about 80 to 90 μm (S18).

Next, the pressed electrode is punched in a form of coin cell properly for size of an electrode cell in drying room conditions (S19) and thoroughly dried in a vacuum drier at 80° C. for 4 hours (S20), thereby manufacturing the final electrode.

When the electrode is manufactured using the $Li_2MnO_3$ composite material, maintaining a proper thickness of the electrode is important so as to optimize workability in electrode manufacture and battery performance. That is, when the thickness of the electrode is increased, capacity thereof increases whereas fluidity of the slurry as an electrode active material is reduced in pressing after applying to the electrode, making it difficult to uniformly apply the slurry to an electrode collector and causing deterioration in combining the collector and the active material and adhesion between active materials. Thus, the electrode has a proper thickness based on materials. In the present embodiment, the electrode has a thickness of about 50 to 200 μm, preferably about 80 to 150 µm, ideally around 100 µm to obtain efficient electrode manufacture and electrode characteristics.

A coin cell is manufactured to evaluate electrochemical characteristics of the manufactured electrode. For instance, a 2032 coin cell is manufactured by assembling a lithium metal as an anode, a PE separator, and an electrolyte prepared by dissolving 1 M LiPF$_6$ in a mixture solvent of ethylene carbonate and diethyl carbonate at a volume ratio of 1:1.

Next, electrochemical characteristics of the electrode are evaluated to examine performance of the electrode.

An electrode is manufactured using the prepared high-capacity Li$_2$MnO$_3$ composite material as a cathode and is used to manufacture a 2032 coin cell, and charging and discharging characteristics of the electrode cell are evaluated. The electrode cell is charged and discharged at a constant current, i=0.1 C, in a voltage range of 2.0 to 4.5 V or 2.0 to 4.9 V, and results are illustrated in FIGS. 6 to 9. Also, oxidation and reduction behaviors of lithium of the cathode material of the electrode cell are identified by a potential sweep method at a scan rate of 0.05 millivolts/second (mV/s) in a charging and discharging voltage range of 2.0 to 4.5 V or 2.0 V to 4.9 V.

EXAMPLE 1

As described above, the synthesized Li$_2$MnO$_3$-based composite material, a conductive agent and a binder were used at a weight ratio of 80:10:10 wt % to prepare a slurry. The prepared slurry was formed into a film on aluminum foil with a thickness of 20 µm by casting, in which the slurry was applied uniformly in one direction with constant force. The applied slurry was thoroughly dried overnight in an ordinary drier at 110° C. The thoroughly dried electrode was adjusted to have a thickness of about 100 µm, and was subjected to pressing using a roll press so that the thickness is finally reduced by about 20% to about 80 µm. The pressed electrode was punched properly for size of a coin cell in drying room conditions and thoroughly dried in a vacuum drier at 80° C. for 4 hours.

A 2032 coin cell was manufactured using the manufactured electrode as a cathode, a lithium metal as an anode, a separator and an electrolyte prepared by dissolving 1 M LiPF$_6$ in a mixture solvent of ethylene carbonate and diethyl carbonate at a volume ratio of 1:1.

Figure 6:
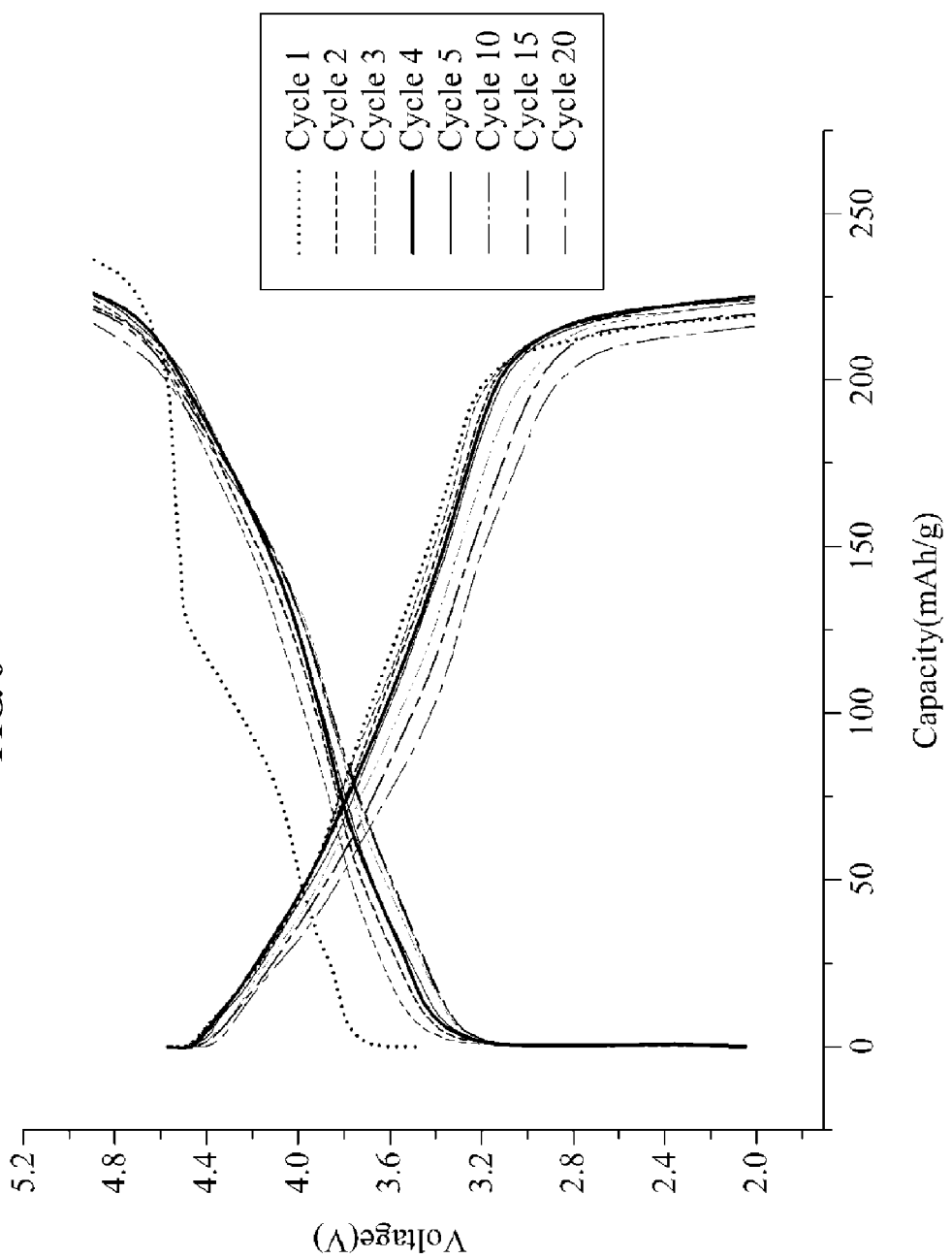
FIG. 6 is a graph illustrating charging and discharging properties of a cathode composite material synthesized according to Example 1.
Figure 7:
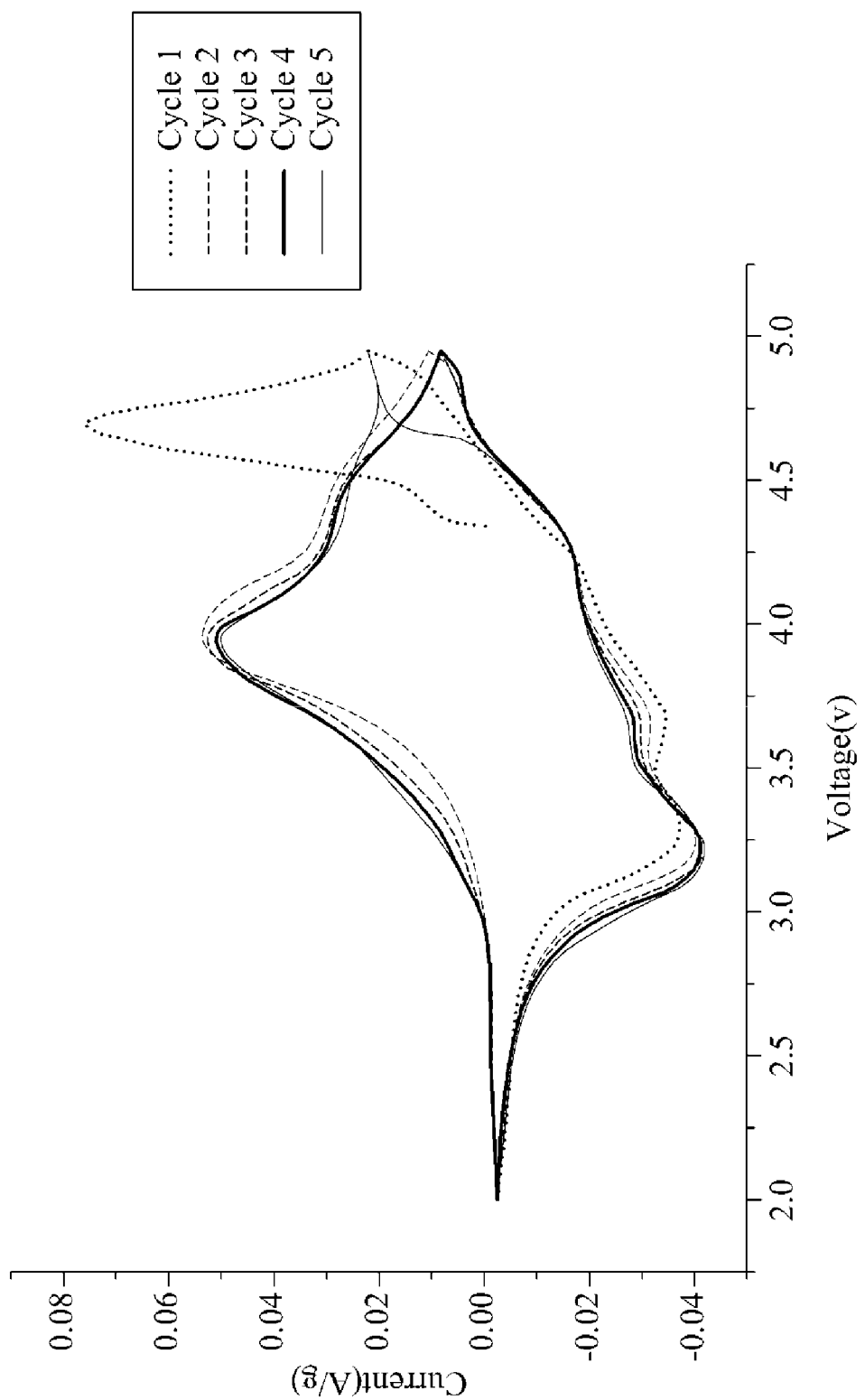
FIG. 7 is a graph illustrating oxidation and reduction properties of the cathode composite material synthesized according to Example 1.

The manufactured electrode cell was aged for about 1 to 2 days, followed by conducting a charging and discharging test at a current density of 0.1 C and room temperature in a voltage range of 2.0 to 4.9 V and evaluating oxidation and reduction behaviors by a potential sweep method at a scan rate of 0.05 mV/s in a voltage range of 2.0 V to 4.9 V. Test and evaluation results are illustrated in FIGS. 6 and 7.

EXAMPLE 2

A Li$_2$MnO$_3$-based composite material Li(Li$_x$Ni$_y$Co$_z$Mn$_w$O$_2$) and an electrode were manufactured in the same manner as in Example 1, and performance of a cell was evaluated in different conditions from Example 1. That is, a charging and discharging test was conducted at a current density of 0.1 C and room temperature in a voltage range of 2.0 to 4.5 V and oxidation and reduction behaviors were evaluated by a potential sweep method at a scan rate of 0.05 mV/s in a voltage range of 2.0 V to 4.5 V. Test and evaluation results are illustrated in FIGS. 8 and 9.

According to the present invention, the Li$_2$MnO$_3$-based composite material is charged with up to 4.9 V in terms of a charging and discharging voltage range, unlike cathode materials such as LiCoO$_2$ (LCO) or LiMnO$_2$ (LMO), thereby enabling the manufacture of a remarkably high-capacity battery system. In the present invention, the Li$_2$MnO$_3$-based composite material is used to manufacture an electrode and then manufacture a coin cell, after which the cell is charged and discharged in a range of 2.0 to 4.9 V or electrochemical characteristics of the cell are evaluated in a relatively safe range of 2.0 to 4.5 V in view of safety of the cell. As a result, in charging and discharging cycle tests in a high voltage range of 2.0 to 4.9 V, the cell has a capacity of about 200 mAh/g or higher, exhibiting electrochemical reversibility. Further, the cell has an initial capacity of about 120 mAh/g in a voltage range of 2.0 to 4.5 V, but gradually increases in capacity depending on cycles, to 175 mAh/g in Cycle 15, exhibiting excellent capacity.

Figure 8:
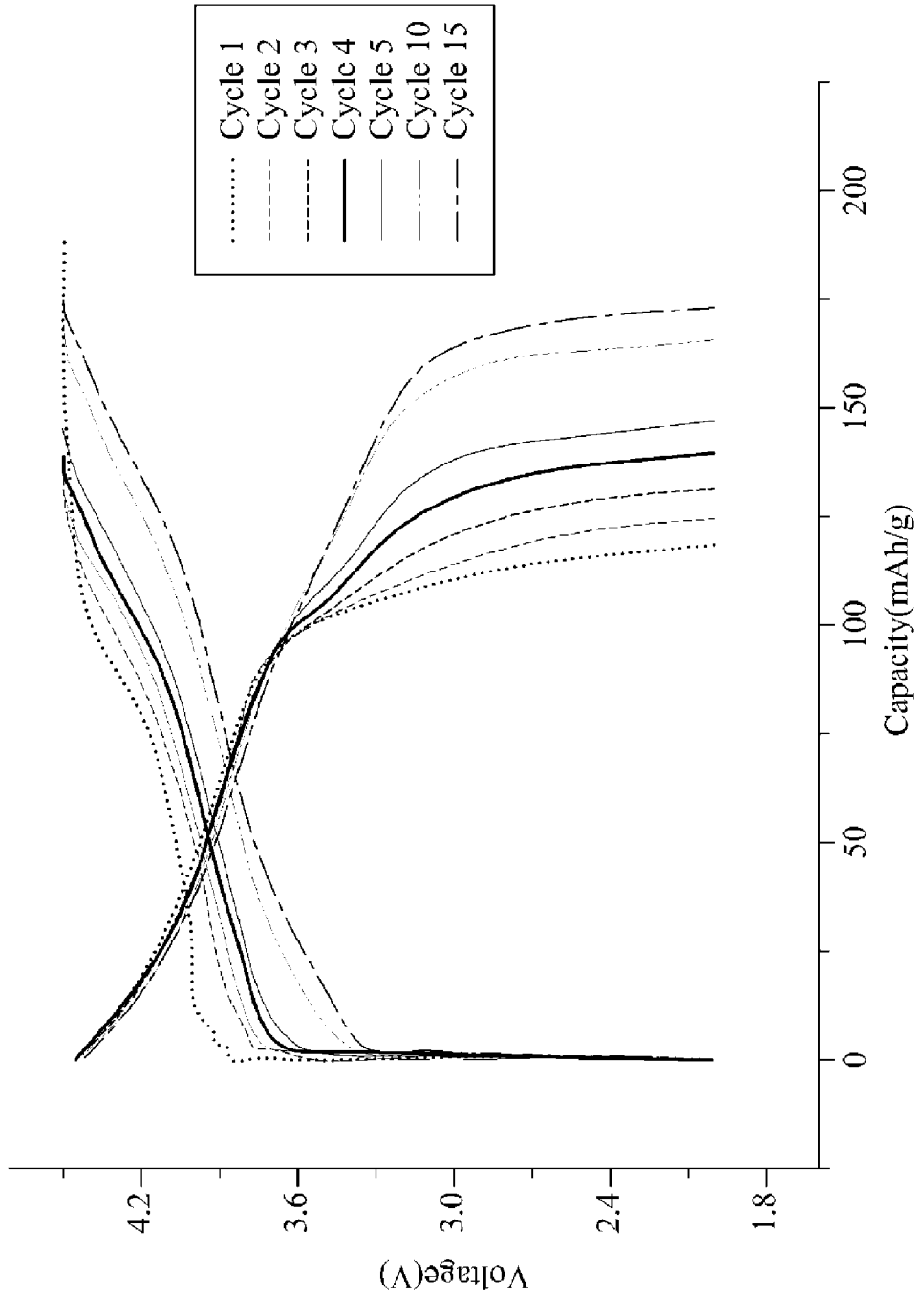
FIG. 8 is a graph illustrating charging and discharging properties of a cathode composite material synthesized according to Example 2.
Figure 9:
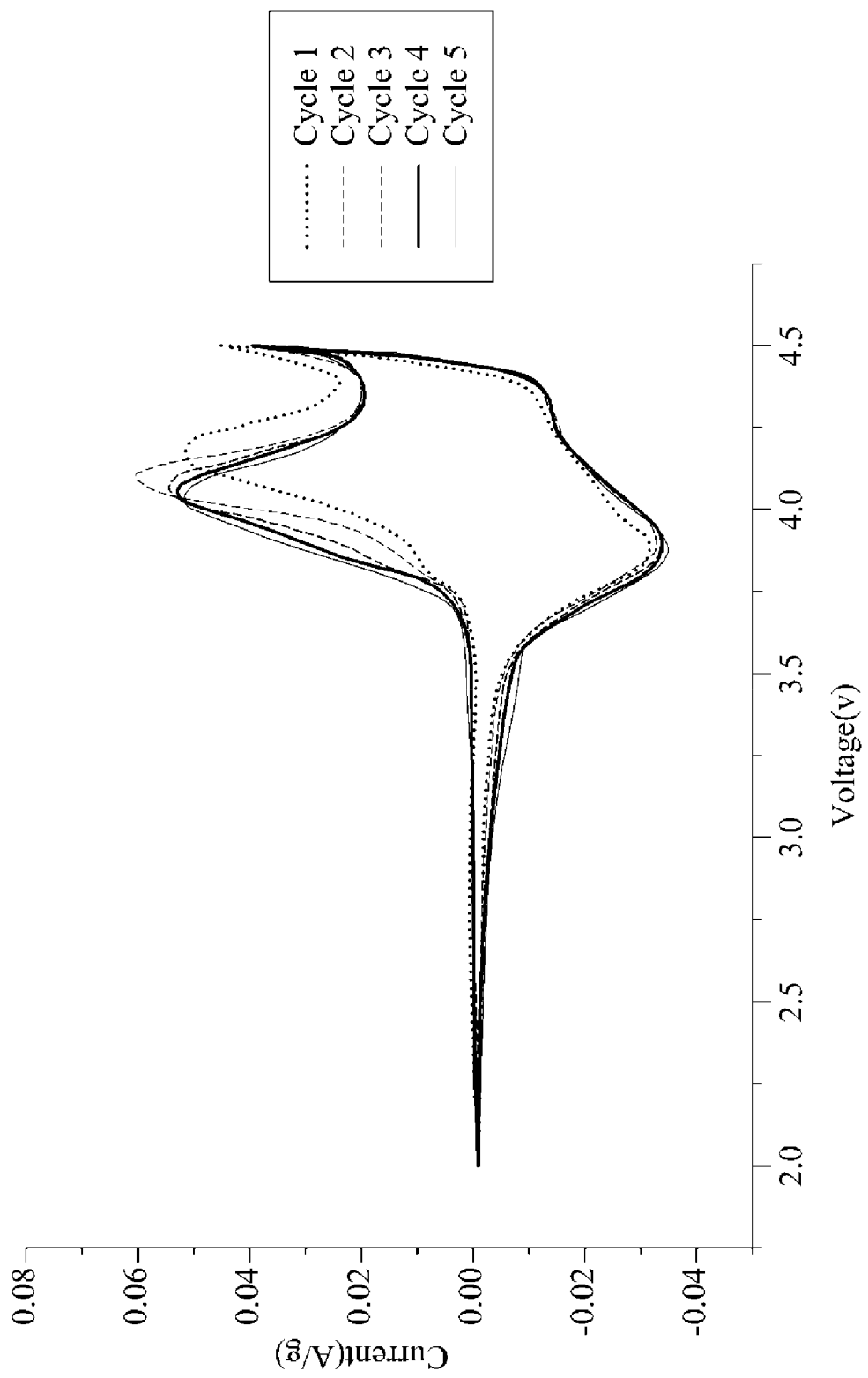
FIG. 9 is a graph illustrating oxidation and reduction properties of the cathode composite material synthesized according to Example 2.

Referring to FIGS. 6 to 9, the Li$_2$MnO$_3$-based composite material electrodes ensure a high-capacity cell performance of 200 mAh/g or higher as shown in FIG. 6, when directly evaluated in a 2.0 to 4.9 V range. Such a cell characteristic is about twice higher than 110 to 140 mAh/g when a conventional cathode material for a lithium secondary battery is used. Moreover, as the slurry of the electrode is uniformly applied to the foil as a collector by the electrode manufacture process of the present invention and the thickness of the electrode is maintained so as to achieve optimal electrochemical reaction of the active material, a high capacity of about 200 mAh/g or higher is ensured in cell performance evaluation. Also, as shown in FIG. 8, in a low charging and discharging voltage range of 2.0 to 4.5 V, a high capacity of about 175 mAh/g is obtained in Cycle 15.

Particularly, as identified by the potential sweep method, when the Li$_2$MnO$_3$-based composite material is subjected to charging and discharging cycles in a range of 2.0 to 4.9 V, shown in FIG. 7, a charging voltage (oxidation peak) is about 3.9 V and a discharging voltage (reduction peak) is about 3.2 V. Also, when charging and discharging are conducted in a lower range of 2.0 to 4.5 V, shown in FIG. 9, a charging voltage (oxidation peak) is about 4.1 V and a discharging voltage (reduction peak) is about 3.85 V, which are maintained to be high. Thus, the cathode material according to the present invention has cell charging and discharging conditions such that an average voltage is maintained to be remarkably high, about 3.85 V, and a capacity is maintained at 175 mAh/g or higher in a charging and discharging voltage of about 4.5 V, and exhibits extremely irreversible oxidation peak behavior at about 4.5 to 4.9 V in a high voltage range of 2.0 to 4.9 V, as identified by the potential sweep method. Such an irreversible oxidation peak is identified as an oxidation peak of LiO, and when this peak is sufficiently reacted in Cycle 1, potentials of oxidation and reduction peaks move in a negative (−) direction from Cycle 2 so that an average discharging voltage decreases based on cycles. Electrochemical oxidation and reduction behavior in a high voltage range of 2.0 to 4.9 V is estimated to be due to oxidative decomposition of a current organic electrolyte of a lithium secondary battery and reactivity with the cathode material. In the present invention, the electrode cell may be used at a voltage range of 2.0 to 4.5 V to obtain reversible use conditions, a high voltage and a high capacity if the current organic electrolyte is used. When an electrode cell is manufactured with an organic electrolyte and a solid electrolyte suitable for a high voltage, which will be developed and applied, the electrode cell may be charged and discharged in a high voltage range of 2.0 to 4.9 V.

Concisely, according to the exemplary embodiments of the present invention, the Li$_2$MnO$_3$ material is basically inactive electrochemically, and when subjected to complexation with about 30 wt % of NMC, the $Li_2MnO_3$ material is considerably improved in electrochemical activity, substantially enhancing from 20 mAh/g to 120 mAh/g. In complexation of the $Li_2MnO_3$ material and the NMC material, even though NMC content increases by 50% or 70%, a considerable effect is not exhibited. Thus, according to the exemplary embodiments of the present invention, a $Li_2MnO_3$ material enabling high energy density by high capacity may be synthesized and the synthesized material may realize high capacity via complexation.

While the present invention has been shown and described with reference to specific details including concrete constituent elements, a few exemplary embodiments and the accompanying drawings, it should be noted that these are provided to ease the comprehensive understanding of the present invention. The present invention is not limited to the foregoing embodiment, and it will be apparent to those skilled in the art that various modifications and variations can be made from the foregoing descriptions. Therefore, the idea of the present invention is not defined by the foregoing embodiments, and the appended claims, alternative claimed subject matter and equivalents to the claimed subject matter are construed as being within the scope of the present invention.

The invention claimed is:

1. A method of preparing a cathode material for a lithium secondary battery using a $Li_2MnO_3$-based composite material $Li(Li_xNi_yCo_zMn_wO_2)$ obtained by reacting a starting material mixture of a nickel nitrate solution, a manganese nitrate solution, and a cobalt nitrate solution with a complex agent by co-precipitation, wherein the $Li_2MnO_3$-based composite material comprises $LiMn_{1/3}C_{1/3}Ni_{1/3}O_2$ (NMC), and mixing the NMC with $Li_2MnO_3$.

2. The method of claim 1, wherein the starting material mixture is obtained by mixing $Ni(NO_3)_2 \cdot 6H_2O$, $Mn(NO_3)_2 \cdot 6H_2O$ and $Co(NO_3)_2 \cdot 6H_2O$ at a mole ratio of 1:4:1.

3. The method of claim 2, wherein the complex agent comprises an ammonia solution, and the starting material mixture is mixed with a 0.8 molar (M) complex agent.

4. The method of claim 2, wherein a NaOH solution is added to a mixed solution of the starting material mixture and the complex agent to adjust a pH.

5. The method of claim 1, wherein lithium(x) is in a range of 0.02 to 0.60 in the composite material $Li(Li_xNi_yCo_zMn_wO_2)$.

6. The method of claim 5, wherein x is 0.05, y is 0.16, z is 0.18 and w is 0.66 in the composite material $Li(Li_xNi_yCo_zMn_wO_2)$.

7. The method of claim 1, wherein $Li_2MnO_3$ is prepared by precipitating a $Li_2MnO_3$ precursor by mixing and titrating a lithium hydroxide solution with a manganese solution, drying the $Li_2MnO_3$ precursor, conducting first-sintering on the dried $Li_2MnO_3$ precursor at 650° C. for 12 hours, and conducting second-sintering at 850° C. for 24 hours after the first-sintering is completed to produce a final $Li_2MnO_3$ powder.

8. The method of claim 1, wherein a mass fraction of NMC mixed with the $Li_2MnO_3$ is 30%.

9. The method of claim 1, wherein reacting the starting material mixture with the complex agent by co-precipitation comprises maintaining a reactor temperature at a threshold temperature of 55° C.

10. The method of claim 9, further comprising, after completion of the co-precipitation, aging a co-precipitate formed from reacting the starting material mixture with the complex agent at the threshold temperature for 24 hours.

11. A method of manufacturing an electrode of a lithium secondary battery, the method comprising:

synthesizing a $Li_2MnO_3$-based composite material $Li(Li_xNi_yCo_zMn_wO_2)$ by mixing a starting material mixture of a nickel nitrate solution, a manganese nitrate solution and a cobalt nitrate solution with a complex agent by co-precipitation;

preparing a slurry by mixing the composite material $Li(Li_xNi_yCo_zMn_wO_2)$ with a conductive agent and a binder, titrating the slurry with n-methylpyrrolidone (NMP) until a threshold viscosity is reached, and stabilizing the slurry viscosity by milling the slurry for a threshold time;

applying the slurry;

drying the applied slurry;

pressing the dried slurry; and punching the slurry in an electrode cell form.

12. The method of claim 11, wherein the slurry is prepared by mixing the composite material $Li(Li_xNi_yCo_zMn_wO_2)$, the conductive agent, and the binder at a weight ratio (wt %) of 80:10:10.

13. The method of claim 11, wherein the $Li_2MnO_3$-based composite material comprises $LiMn_{1/3}Co_{1/3}Ni_{1/3}O_2$ (NMC), and wherein the slurry is prepared by adding the NMC to $Li_2MnO_3$ wherein a mass fraction of NMC added to the $Li_2MnO_3$ is 30%.

14. The method of claim 11, wherein pressing the dried slurry comprises reducing a thickness of the slurry by 20% after applying the slurry.

15. The method of claim 14, wherein applying the slurry comprises applying the slurry to an aluminum foil to form a thoroughly dried electrode having a thickness of 100 to 110 micrometers (μm).

16. The method of claim 15, wherein pressing the dried slurry comprises pressing the thoroughly dried electrode to a thickness of 80 to 90 μm.

17. A method of charging and discharging a lithium secondary battery, the method repeatedly charging and discharging an electrode cell at a constant electric current density of 0.1 C within a range of 2.0 to 4.9 volts (V), the electrode cell being manufactured by using a $Li_2MnO_3$-based cathode composite material $Li(Li_xNi_yCo_zMn_wO_2)$ synthesized by reacting a starting material mixture of a nickel nitrate solution, a manganese nitrate solution and a cobalt nitrate solution with a complex agent by co-precipitation, wherein the $Li_2MnO_3$-based cathode composite material comprises $LiMn_{1/3}C_{1/3}Ni_{1/3}O_2$ (NMC), and mixing the NMC with $Li_2MnO_3$.

18. The method of claim 17, wherein the electrode cell reversibly increases in voltage at 4.5 V and maintains a high capacity of 175 milliampere hours/gram (mAh/g) at a 15 cycle in charging and discharging.

19. The method of claim 17, wherein the electrode cell ensures a high-capacity cell performance of 200 mAh/g or higher when directly evaluated in a 2.0 to 4.9 V range.

* * * * *